US006547994B1

(12) United States Patent
Monkhouse et al.

(10) Patent No.: US 6,547,994 B1
(45) Date of Patent: Apr. 15, 2003

(54) RAPID PROTOTYPING AND MANUFACTURING PROCESS

(75) Inventors: Donald C. Monkhouse, Radnor, PA (US); Sandeep Kumar, Sunnyvale, CA (US); Charles W. Rowe, Medford, MA (US); Jaedeok Yoo, Philadelphia, PA (US)

(73) Assignee: Therics, Inc., Princeton, NJ (US)

( * ) Notice: Subject to any disclaimer, the term of this patent is extended or adjusted under 35 U.S.C. 154(b) by 0 days.

(21) Appl. No.: 09/439,179

(22) Filed: Nov. 12, 1999

Related U.S. Application Data
(60) Provisional application No. 60/108,400, filed on Nov. 13, 1998.

(51) Int. Cl.[7] .......................... B29C 41/02; B29C 41/52; B29C 67/00; B29C 67/20
(52) U.S. Cl. .......................... 264/40.1; 264/41; 264/113; 264/255; 264/308
(58) Field of Search .................. 264/40.1, 41, 113, 264/255, 308

(56) References Cited

U.S. PATENT DOCUMENTS 5,260,009 A 11/1993 Penn
5,490,962 A 2/1996 Cima et al.
6,280,771 B1 * 8/2001 Monkhouse et al. ........ 424/484

FOREIGN PATENT DOCUMENTS

WO    WO9841189 A1    9/1998

OTHER PUBLICATIONS

Frank et al., "Knowledge–Based Assistance for the Development of Drugs," *IEEE Expert*, vol. 12(1):pp. 40–48, Jan. 1, 1997.

* cited by examiner

Primary Examiner—Leo B. Tentoni
(74) Attorney, Agent, or Firm—Seed IP Law Group PLLC

(57) ABSTRACT

A fabrication method to rapidly fabricate different prototypes of drug delivery systems, medical devices, pharmaceutical dosage forms, tissue scaffolds or other bioaffecting agents in small batches or individual forms using a computer-guided system to vary the composition and structure in order to optimize the product and the manufacturing process. The process is immediately scalable. An Expert System can be used with the method to recommend different compositions and designs of the prototypes, devices, dosage forms, tissue scaffold or other bioaffecting agents.

22 Claims, 8 Drawing Sheets

Schematic view of the three-dimensional printing process

Figure 1. Schematic view of the three-dimensional printing process

Figure 2. Designed vs. measured active content in multi-level active dosage example Figure 3. Simultaneous fabrication of an active-containing device and a placebo device.

Figure 5. Designed vs. measured active content in multi-level active dosage example
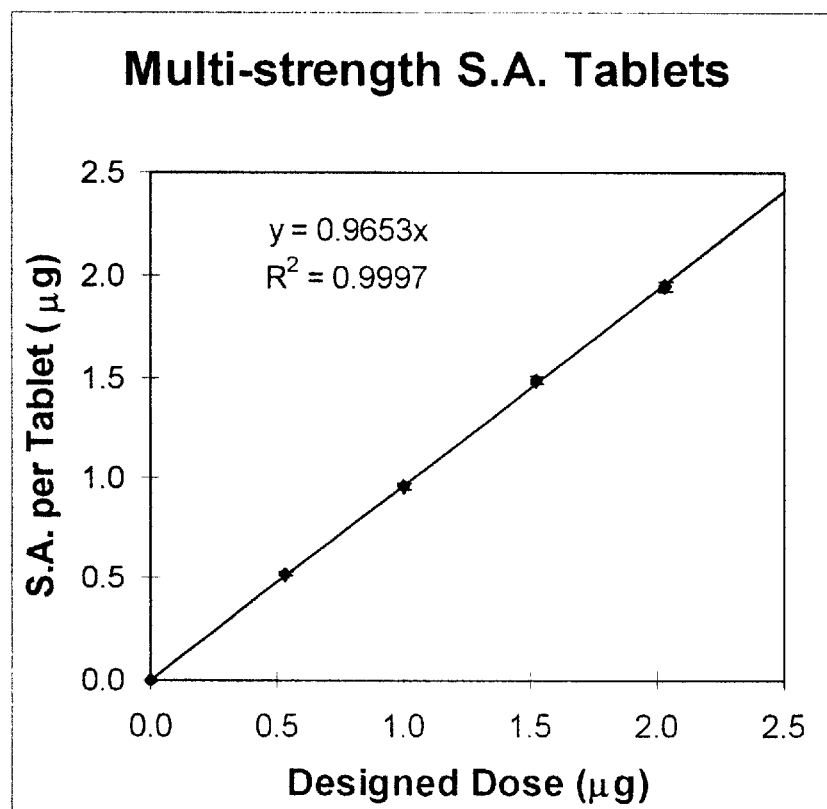

Figure 6.   Designed vs. measured active content in multi-level active dosage example
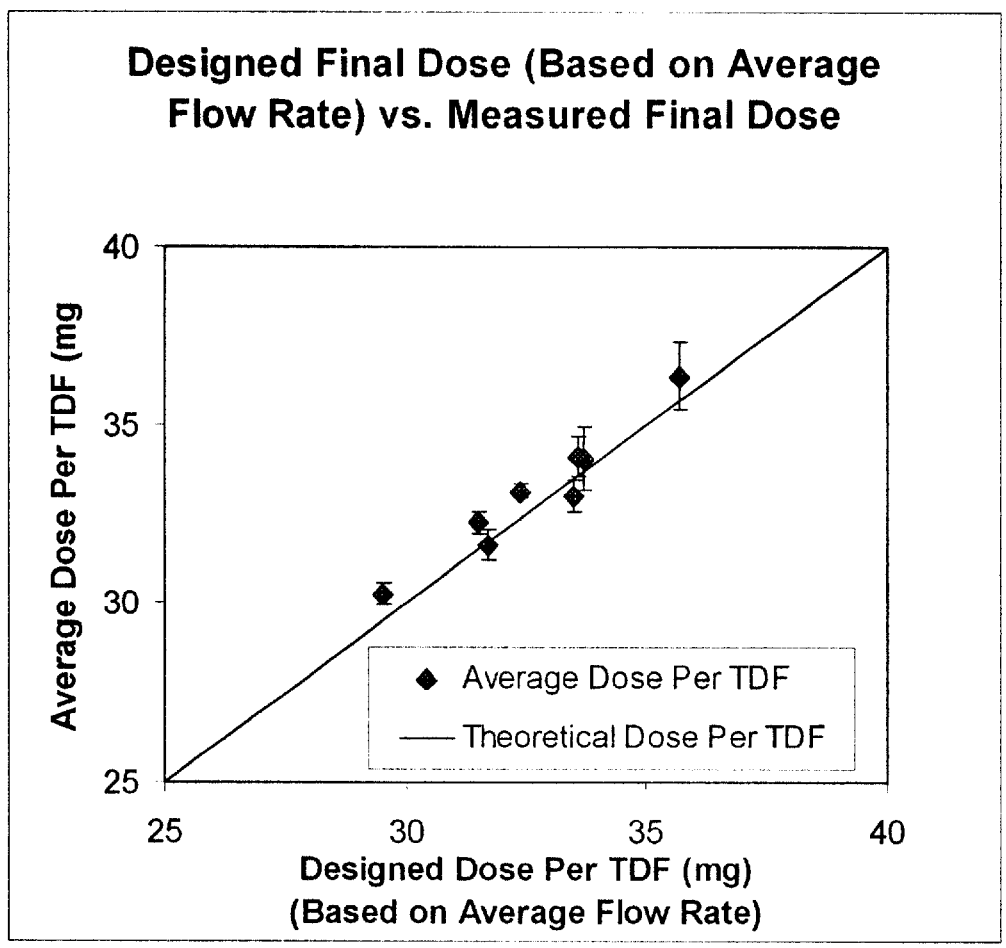

Figure 7. Relationship between flow rate and dispersion time for different formulations
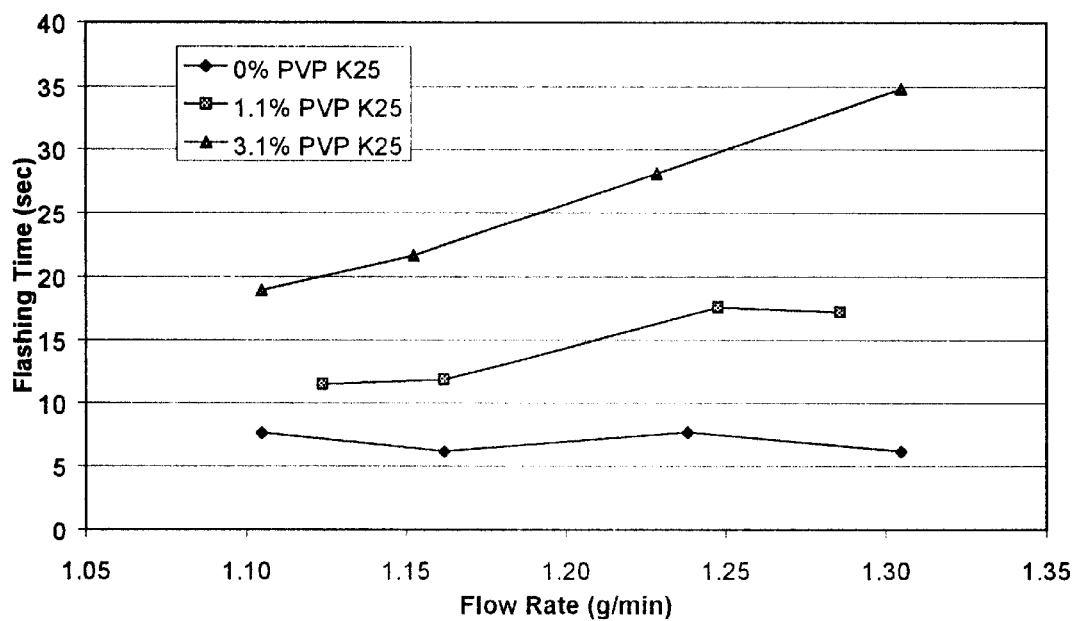

Figure 8. Dissolution profiles of camptothecin oral dosage forms prototyped using different powder formulations
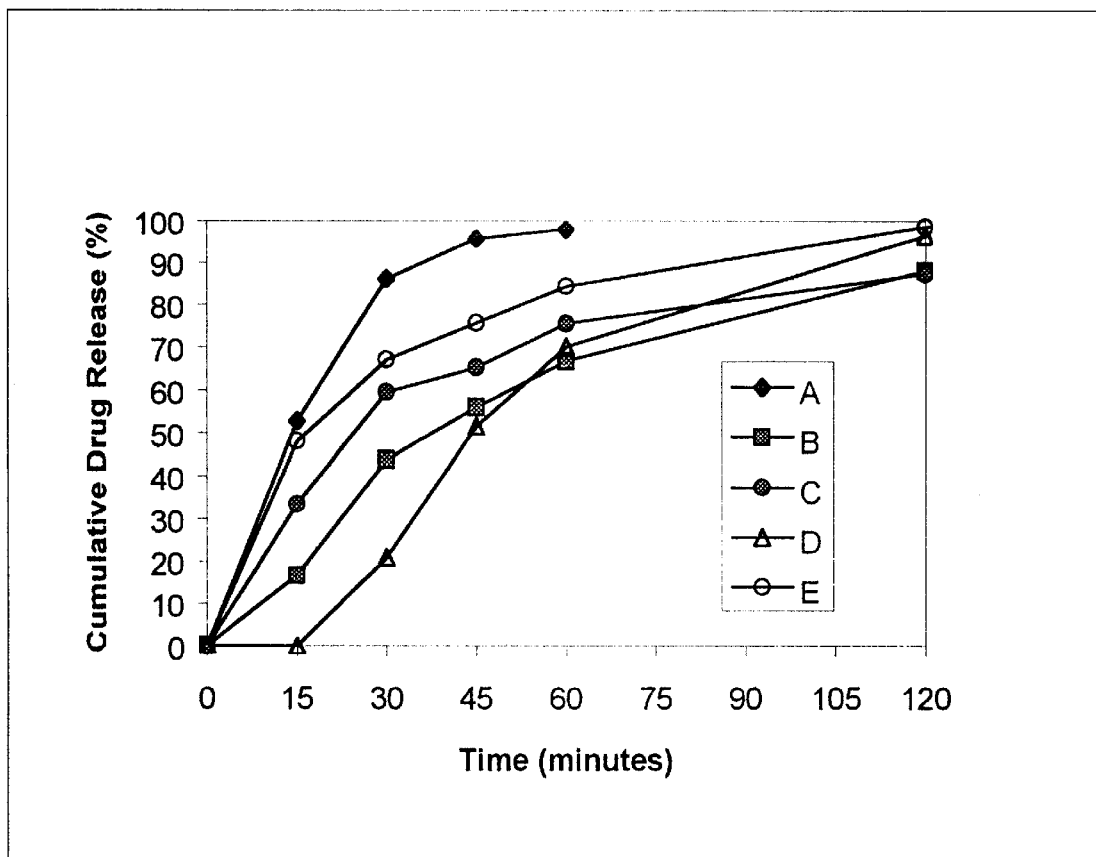

RAPID PROTOTYPING AND MANUFACTURING PROCESS

CROSS-REFERENCE TO RELATED APPLICATION

This application claims the benefit of Provisional Application No. 60/108,400, filed on Nov. 13, 1998. This provisional application is incorporated herein by reference in its entirety.

TECHNICAL FIELD

The invention relates to a fabrication method for formulating pharmaceutical or other bioaffecting agents in small batches or individual forms using a computer-guided system capable of varying parameters and storing the information so that those parameters used in prototyping may be reproduced during fabrication of quantities of any amount. The system is further capable of interfacing with a computer-based learning system.

BACKGROUND OF THE INVENTION

Modern drug discovery efforts are exploiting at least three core technologies aimed at increasing the efficiency of finding drug leads: genomics, high-throughput screening, and combinatorial chemistry. Research aimed at the human genome is rapidly multiplying the number of disease targets. Screening methods using biological assays can quickly show if a compound is a "hit", that is, if it has activity against a target. Combinatorial chemistry methods can produce and help optimize the compounds used in screening. Many pharmaceutical companies view this state-of-the-art technology as being necessary to compete in the market.

On the other hand, the previous or "classical" approach to drug discovery involved:

A) synthesizing molecules known to be related to natural or other synthetic structures having some or all of the desired pharmaceutical activity;

B) testing small quantities of purified or otherwise defined chemical compositions in biological assays;

C) selecting a "lead compound" to continue investigating, which may include human clinical trials; and, D) redesigning the compound an redevelopment of a "second lead".

The classical process was prone to requiring several decades of development time in order to learn whether the candidate molecule or substance would succeed or fail. Companies with larger collections of compounds or compound libraries have had an empirical advantage.

The next set of innovations included the miniaturization of both the activity assays and the synthetic processes for generating a large number of test candidates. Combinatorial chemistry, broadly defined as the generation of numerous organic compounds through rapid simultaneous, parallel or automated synthesis, is changing how chemists create chemical libraries and is expected to change the speed at which drugs are found. Combinatorial chemistry techniques rely on the alteration of simple steps or ingredients in a sequence of steps to randomly produce a series of related test candidates or prototypes. These candidates are then screened for presence of desired biological activity. The so called "high throughput screens" rely on semiautomated and usually miniaturized versions of traditional calorimetric, potentiometric, fluorometric, radiometric, or other signal generating systems coupled to a desired biological marker or activity. The use of biological systems, such as "phage display libraries", has allowed for systems other than mechanized synthesis to be used in generating the raw material to screen.

The advents of combinatorial chemistry and rapid in vitro screening have, therefore, dramatically increased the efficiency of the chemist in discovering new drug entities. However, at the moment, there are no known techniques for handling the rational and rigorous formulation development of drug delivery systems for the plethora of new compounds, other than substantially increasing headcount and requisite equipment. Traditional oral dosage form processing requires a multitude of sequential steps, which may include powder mixing and blending, wet granulation and drying, lubrication. compression, and coating. This approach to formulation development can be characterized as a linear method. Consequently, development of successful formulations is very time consuming and severely limits the ability of pharmaceutical companies to expeditiously bring new drugs to the market.

The formulation scientist has traditionally relied on training and experience to formulate a novel, active agent of known chemical and physical properties. The scientist has to take into consideration many characteristics of the active agent in designing a dosage form, including suitable route of administration, drug release, distribution, metabolism, elimination, stability, and compatibility with excipients. Consequently, the formulation scientist has a large number of criteria to satisfy and optimize. Furthermore, the formulation must be stable and amenable to scale-up in order to produce commercial quantities.

One of the problems facing formulation scientists is that the production and testing of small batches of formulations, such as tablets, is as time consuming as the production of large batches. Therefore, in order to make batches of tablets, for example, in sufficient quantity for clinical and stability testing, a single limited production has to be completed.

Another problem of the prior art is with respect to the fabrication of structures with designed pore or channel structures. It has been a challenging task even with additive manufacturing processes such as 3DP. Structures with radial or vertical channels of hundreds of microns in diameter were fabricated; however, the formation of narrower and tortuous internal structures were best affected by the use of a sacrificial material. One common practice in the construction of tissue engineering matrices was the use of mixtures of water soluble particulates (sodium chloride) with non-water soluble polymers dissolved in a solvent to fabricate specimens. The salt particles were leached out of the device with water to reveal a porous structure. While this technique was used in fabricating a network of pores, control of pore architecture was lost.

SUMMARY OF THE INVENTION

The invention relates to a solid free-form fabrication method to rapidly fabricate different prototypes of drug delivery systems or medical devices in small batches or individual forms using a computer-guided system to vary the composition and structure in order to optimize the product and the manufacturing process, and which process is immediately scalable.

In another aspect, the invention provides for an Expert System for recommending the different compositions and designs of pharmaceutical formulations or s medical devices. The invention further allows for formulation of active-containing dosage forms in small batches or individual forms that have different rates of release of the active agent.

The system of the present invention allows the formulator to make only the required number of units of a prototype necessary for the desired tests. This is accomplished by using computer-controlled processes, such as solid free-form fabrication (SFF) techniques. The use of computer-aided manufacturing techniques allows the same prototype to be reproduced in any batch size for further testing or for commercialization, provided the same sequence of machine instructions is used. Furthermore, such processes allow fabrication of several different prototype designs in a short time. This significantly reduces the development time of new products compared to conventional technologies, such as tablet compression, which translates into huge cost savings for companies.

The system further allows extremely small batches, even individual items, to be fabricated with known composition within a single manufacturing run. Therefore, biological and stability testing can be run economically and expeditiously in parallel allowing for the rapid screening of prototype formulations to match the rapid selection of prototype agents available for further development work.

The present invention takes advantage of a rapid manufacturing process, which affords the possibility of rapid prototyping for that manufacturing process. The principle by which this process works is that a formulator designs a dosage form or medical device on a computer workstation using a computer aided design (CAD) software. The workstation then converts the information into machine instructions that would allow fabrication of the CAD-generated 3-D object using suitable materials, generally by building the object layer-by-layer.

SFF is an example of a computer-aided manufacturing process suitable for practicing the teachings of this invention. This process allows a high degree of design flexibility, not only in terms of macroscopic architecture, but most importantly, in composition, microstructure and surface texture within the part being manufactured. The process is easily scaleable, permitting quantities ranging from pre-production prototyping through to manufacturing volumes to be made using a single process. These factors distinguish this unique process from other fabrication approaches and make it ideally suited for manufacturing clinical supplies where materials and design play critical roles in product differentiation (with matching placebos), where shortened product lead-times are of critical strategic advantage, where traditionally large quantities of valuable GMP material are severely limited, and where product/process validation underlies the ability to gain product marketing approval and assure patient safety. A specific example of an SFF process is three dimensional printing (3DP) in which drugs are delivered through a printhead into a bed of powdered excipient blend, and the particles are "glued" together into three dimensional shapes using suitable polymers or binders. An unlimited variety of architectures can be achieved using this technique ranging from simple tablet, capsule, caplet, and rod like shapes for dosage forms to complicated macro and micro architectures for medical devices. Furthermore, the prototypical dosage forms and medical devices, which are produced for clinical supplies, can also be fabricated in production quantities without changing the process. This simplifies the transition from formulation development to manufacturing with faster, less costly scale-up and pre-scribed validation of production. Numerous production steps are also consolidated into one machine resulting in savings in plant design, capital costs and space requirements. These features minimize design-related compromises and reduce the cost and time normally associated with traditional processes.

The FDA requires a bioequivalence study for a drug delivery formulation if there is a change in composition, process, scale, or site of manufacturing. Several bioequivalence studies are usually performed during product development and scale-up stages of pharmaceutical dosage forms using conventional manufacturing technologies. If the methods taught by this invention are used, the composition and the process parameters can be kept the same, and because each unit is reproducibly fabricated, scale is inconsequential. Thus, it is anticipated that by using the methods of this invention, the number of bioequivalence studies performed during a product development program can be significantly reduced, thereby reducing the time and expenses incurred.

Another significant advantage offered by the use of solid free form fabrication techniques is that toxic or potent compounds can be safely incorporated in an "excipient envelope", thereby minimizing worker exposure. Altering release rate or sequence of release of combination products is also easily accomplished through the use of suitable polymers. All of these adjustable parameters can be secured for future reference and guidance through the adoption and maintenance of an "Expert System", where the use of artificial intelligence can speed up excipient and binder selection, as well as build strategies, including geometry, texture, shape, and binder addition rates. In the simplest form, the Expert System will comprise a suitable database of formulations and an inference engine capable of predicting new formulations based on predefined rules.

BRIEF DESCRIPTION OF THE DRAWINGS

FIG. 5 is a graph plotting the designed vs. measured content of salicylic acid in multi-strength dosage forms fabricated simultaneously in a single powder bed using 3DP process in accordance with ore embodiment of the present invention.

FIG. 6 is a graph plotting the designed vs. measured content of pseudoephedrine hydrochloride in multi-dose dosage forms fabricated simultaneously in a single powder bed using the 3DP process in accordance with one embodiment of the present invention.

FIG. 7 is a graph depicting the relationship between the flow rate and flashing time for formulations containing three different PVP contents.

FIG. 8 is a graph plotting the time vs. cumulative drug release percentage in camptothecin oral dosage forms using different powder formations in accordance with one embodiment of the present invention.

DETAILED DESCRIPTION OF THE INVENTION

Figure 1:
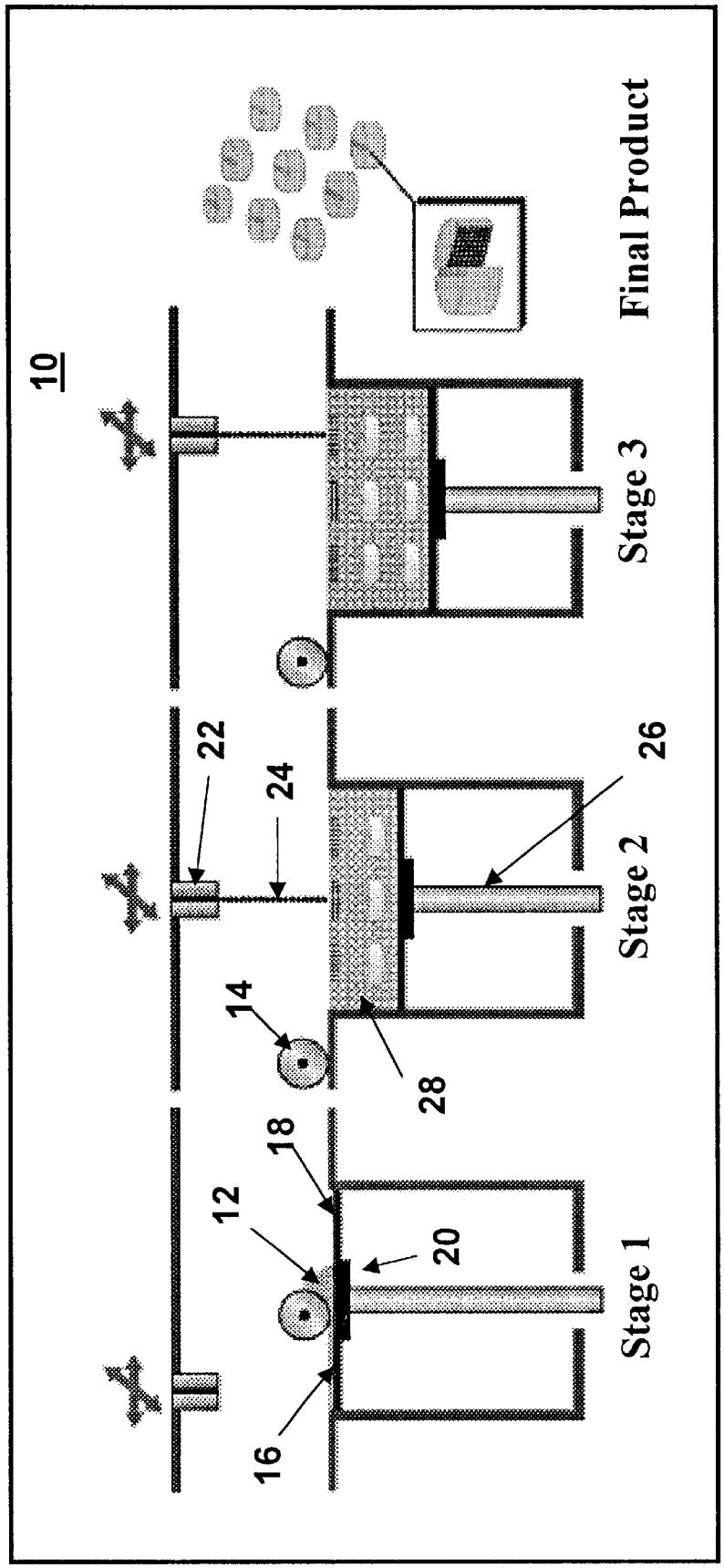
FIG. 1 shows a schematic view of the three-dimensional printing process in accordance with one embodiment of the present invention.

The present invention teaches the use of computer-aided manufacturing processes to perform rapid designing, prototyping, and manufacturing. One category of such computer-aided manufacturing techniques is solid free-form fabrication (SFF), which is capable of creating complex structures via a layering process. As defined herein, SFF refers to any manufacturing technique that builds a complex three dimensional object as a series of points or two dimensional layers. Solid free-form fabrication methods offer several unique opportunities for the construction of dosage forms. Solid free-form fabrication methods are also used to manufacture devices for allowing tissue regeneration and for seeding and implanting cells to form organ and structural components, and which devices additionally provide controlled release of active agents.

The SFF methods can be adapted for use with a variety of polymeric, inorganic and composite materials to create structures with defined compositions, strengths, and densities, using computer aided design (CAD). This means that unconventional microstructures, such as those with complicated porous networks or unusual composition gradients, can be designed at a CAD terminal and built through an SFF process.

Examples of useful SFF techniques include, but are not limited to ballistic particle manufacturing described by Brown et al. in U.S. Pat. No. 5,633,021, fused deposition modeling described by Penn and Crunp et al. in U.S. Pat. Nos. 5,260,009 and 5,503,785, and three-dimensional printing (3DP) described by Sachs, et al. in "CAD-Casting: Direct Fabrication of Ceramic Shells and Cores by Three Dimensional Printing: Manufacturing Review 5 (2), 117–126 (1992) and U.S. Pat. No. 5,204,055 and also by Cima et al. in U.S. Pat. No. 5,490,962. The teachings of which are incorporated herein by reference.

Three-Dimensional Printing (3DP) Process for Drug Delivery Systems or Medical Devices The 3DP process is used to create a solid object by printing fluid droplets into selected areas of sequentially deposited layers of powder and may employ computer-aided design (CAD). Suitable prototyping and manufacturing devices include both those devices having a continuous jet print head and those having a drop-on-demand print head.

The 3DP process of the present invention has been adapted specifically for use with pharmaceutically and biocompatible acceptable materials. Improvements and enhancements over the prior art are described in co-pending patent application U.S. Ser. No. 09/052,179 filed Mar. 31, 1998 (now U.S. Pat. No. 5,934,343). Novel uses of the 3DP apparatus to manufacture drug delivery and medical devices are described in U.S. Ser. No. 09/027,183 filed Feb. 20, 1998; Ser. No. 09/027,290 filed Feb. 20, 1998 (now U.S. Pat. No. 6,280,771); Ser. No. 09/045,661 filed Mar. 20, 1998 (now U.S. Pat. No. 6,261,493) and No. 60/103,853. The instant 3DP process allows control over both structure and composition of drug delivery systems and medical devices. This is achieved at three levels: (1) macroscopic shapes, (at the cm level); (2) intermediate features, such as size, orientation and surface chemistry of pores and channels, (at the 100 micron level); and (3) microscopic features, including porosity in the structural walls of a drug delivery system or medical device (at the 10 micron level).

A broad spectrum of materials can be used in the three-dimensional printing process. Virtually any material that can be made into a powder or bonded with a liquid is a candidate as a matrix material for this fabrication technique. Components have already been constructed from metals, ceramics, polymers, and hydrogels. In addition, different materials can be dispensed through separate nozzles, which is a concept analogous to color inkjet printing. Materials can be deposited as particulate matter in a liquid vehicle, as dissolved matter in a liquid carrier, or as molten matter. The proper placement of droplets can be used to control the local composition and to fabricate components with true three-dimensional composition gradients. The process can utilize a variety of fluids, including biologically compatible organic and aqueous solvents.

Manufacturing Steps

A continuous jet head provides for a fluid that is pressure driven through a small orifice. Droplets naturally break off at a frequency that is a function of the fluid properties and the orifice diameter or due to driving impulse in the fluid delivery line. Initial prototype dosage forms were built using a single jet head. Multiple jet heads are preferred. One example of a DOD printhead utilizes individual solenoid valves that run at frequencies up to 1.2 kHz. Fluid is also pressure driven through these valves and a small orifice is downstream of the valves to ensure accurate and repeatable droplet size when the valve is opened and closed.

3DP is used to create a solid object by printing a binder onto selected areas of sequentially deposited layers of powder or particulates. In the following description, the terms "powder" and "particulates" are used interchangeably. The information needed to form these two-dimensional segments is obtained by calculating the intersection of a series of planes with the computer-aided design (CAD) rendition of the object. Each layer is created by spreading a thin layer of powder over the surface of a powder bed. In one embodiment, a moveable powder piston is located within a build bed, with a powered roller to deliver dispensed powder to a receiving platform located adjacent to the powder feeder mechanism.

A schematic for a typical three-dimensional printing process is shown in FIG. 1. Operation consists of raising the feed piston a predetermined amount for each increment of powder delivery. The roller then sweeps across the surface of the powder feeder bed and deposits it as a thin layer across the receiving platform immediately adjacent to the powder feeder. The powder feeding piston is then lowered as the roller is brought back to the home position, to prevent any back delivery of powder.

The powder piston and build bed arrangement can also consist of multiple piston/beds located in a common housing, which would be used to dispense multiple powders in the following sequence:

1. Line up the first desired powder bed with the rolling/delivery mechanism
2. Increment the movable position piston up to deliver an incremental amount of powder
3. Activate roller to move powder to receiving platform
4. Lower the powder piston driving mechanism
5. Laterally slide the powder feeder housing such that the next desired powder bed is lined up with the delivery mechanism
6. Repeat steps 2, 3, 4 and 5
7. Continue for as many different powders and/or powder layers as required.

This method of powder feeding can be controlled manually or be fully automated. Cross contamination of different powders is minimized since each powder is contained in its own separate beds. One of the advantages to this method is that only one piston raising/lowering mechanism is required for operation, regardless of the number of powder beds. By raising the powder for delivery rather than dropping it from above, problems associated with gravity based delivery systems such as "ratholing", incomplete feed screw filling/ emptying and "dusting" with the use of fine powders is eliminated or minimized since only enough energy is introduced to move the powder up an incremental amount. The powder feeder housing, with its multiple beds and pistons, can also be designed as a removable assembly, which would minimize changeover times from one powder system to another.

The powder bed is supported by a piston which descends upon powder spreading and printing of each layer (or, conversely, the jets and spreader are raised after printing of each layer and the bed remains stationary). Instructions for each layer are derived directly from a computer-aided design (CAD) representation of the component. The area to be printed is obtained by computing the area of intersection between the desired plane and the CAD representation of the object. The individual sliced segments or layers are jointed to form the three dimensional structure. The unbound powder serves to temporarily support the unconnected portions of the component as the structure is built but is removed after completion of printing.

The 3DP process is shown schematically in FIG. 1, wherein a 3DP apparatus is indicated generally by the number 10. Powder 12 is rolled from a feeder source (not shown) in stage I with a powder spreader 14 onto a surface 16 of a build bed 18. The thickness of the spread layer is varied as a function of the type of dosage from being produced. Generally the thickness of the layer can vary from about 50 to about 500 microns. The printhead 22 then deposits the binder (fluid) 24 onto the powder layer and the build piston 26 is lowered one layer distance. Powder is again rolled onto the build bed 18 and the process is repeated until the dosage forms are completed (stages 2 and 3 of FIG. 1). The droplet size of the fluid is from about 20 to about 500 microns in diameter. Servo-motors (not shown) are used to drive the various actions of the apparatus 10.

Production of the Device and Characteristics

The layers harden or at least partially harden as each is printed. Once the desired final part configuration is achieved and the layering process is finished, complete hardening may be achieved by simple air drying or other acceptable means. For example, in some applications it may be desirable that the form and its contents be heated or cured at a suitably selected temperature to further promote binding of the powder particles.

Whether or not further curing is required, the loose unbonded powder particles may be removed using a suitable technique, such as ultrasonic cleaning, to leave a finished device. In the case of drug delivery devices, removal of loose powder internal to the final product is not usually necessary or practiced.

As an alternative to ultrasonic cleaning, water soluble particulates may be used. Fabrication of structures with designed pore structures is a challenging task even with additive manufacturing processes such as 3DP. Cylindrical structures with radial pores of hundreds of microns in diameter can be fabricated; however, the removal of loose powder from the narrow channels requires a cumbersome manual clean up process. One solution is to employ mixtures of water soluble particulates (sodium chloride) with polymers used to fabricate specimens. The small particles then leach out to reveal a porous structure. While this technique is useful in fabricating a network of pores, control of pore architecture is lost. An improvement on this technique is to selectively deposit the soluble phase to form internal soluble patterns prior to building any external features.

Construction of a 3DP component can be viewed as the knitting together of structural elements that result from printing individual binder droplets into a powder bed. These elements are called microstructural primitives. The dimensions of the primitives determine the length scale over which the microstructure can be changed. Thus, the smallest region over which the concentration of active agent can be varied has dimensions near that of individual droplet primitives. Droplet primitives have dimensions that are very similar to the width of line primitives formed by consecutive printing of droplets along a single line in the powder bed. The dimensions of the line primitive depend on the powder particle dimension and the amount of binder printed per unit line length. A line primitive of 500 micron width is produced if a jet depositing 1.1 cc/min of methylene chloride is made to travel at 8"/sec over the surface of a polycaprolactone (PCL) powder bed with 45–75 micron particle size. Higher print head velocities and smaller particle size produce finer lines. The dimensions of the primitive are of a scale related to that calculated by assuming that the liquid volume delivered through the printhead fills the pores of the region in the powder forming the primitive.

Finer feature size is also achieved by printing polymer solutions rather than pure solvents. For example, a 10 wt. % PCL solution in chloroform produces 200 micron lines under the same conditions as above. The higher solution viscosity slows the migration of solvent away from the center of the primitive.

Incorporation of Actives

There are two principle methods for incorporation of active (e.g., a drug). In the first method, a layer of dispersed fine polymer powder is selectively bound by printing a solvent onto the polymer particles which dissolves the polymer. This process is repeated for subsequent layers to build up the desired shape, printing directly on top of the preceding layer, until the desired shape is achieved. If it is desired to design a constant rate release matrix, the active is dissolved or dispersed (e.g., micellar) in the solvent, yielding drug dispersed evenly through the matrix. The printing process for this case would then be continued layer by layer until the desired shape is obtained. In the second method, devices for pulsed release of drugs are prepared by constructing active-rich regions within the polymer matrix. In this case, multiple printheads are used to deposit active containing solvent in selected regions of the powder bed. The remaining volume of the desired device is bound with placebo binder deposited by a separate printhead.

Significant amounts of matter can be deposited in selective regions of a component on a 100 micron scale by printing solid dispersions or solid precursors through a printhead. Furthermore, the use of hundreds of jets is possible. The large number of individually controlled jets make a high rate construction possible by the 3DP process.

Surface finish of the dosage forms of the invention is governed by the physical characteristics of the materials used as well as the build parameters. These factors include particle size, powder packing, surface characteristics of the particles and printed binder (i.e. contact angle), exit velocity of the binder jet, binder saturation, layer height, and line spacing. Interaction of the binder liquid with the powder surface, in particular, can be controlled carefully to minimize surface roughness. In a case where the binder becomes wicked out in a large area, the feature size control may be difficult, resulting in a rough surface.

A number of materials are commonly used to form a matrix for active agent delivery. Unless otherwise specified, the term "biomaterial" will be used to include any of the materials used to form the active agent matrix, including polymers and monomers which can be polymerized or adhered to form an integral unit. In one embodiment the particles are formed of a polymer, such as a synthetic thermoplastic polymer, for example, ethylene vinyl acetate, poly(anhydrides), polyorthoesters, polymers of lactic acid and glycolic acid and other hydroxy acids, and polyphosphazenes, a protein polymer, for example, albumin or collagen, or a polysaccharide containing sugar units such as lactose.

The biomaterial can be non-biodegradable or biodegradable, typically via hydrolysis or enzymatic cleavage. Non-polymeric materials can also be used to form the matrix and are included within the term "biomaterial" unless otherwise specified. Examples include organic and inorganic materials such as hydoxyapatite, calcium carbonate, buffering agents, as well as others used in formulations, which are solidified by application of adhesive rather than solvent.

Drug Delivery Devices

Erodible delivery devices are one of the commonest medical devices constructed. Erodible delivery devices can be in an oral (e.g. pharmaceutical tablets or capsules) or implantable form (e.g. microparticles) depending on the desired mode of delivery of the specific active agent. They differ in the rate and time period over which the active agent is delivered and by the excipients used in the device construction.

Likewise, using a SFF process such as 3DP, the binder can be a solvent for the polymer and/or bioactive agent or an adhesive which binds the polymer particles. Solvents for most of the thermoplastic polymers are known, for example, methylene chloride or other organic solvents. Organic and aqueous solvents for the protein and polysaccharide polymers are also known, although an aqueous solution is preferred if required to avoid denaturation of the protein. In some cases, however, binding is best achieved by denaturation of the protein.

In the 3DP process, the binder can be the same material as is used in conventional powder processing methods or may be designed to ultimately yield the same binder through chemical or physical changes that take place in the powder bed after printing, for example, as a result of heating, photopolymerization, or catalysis.

The selection of the solvent for the active depends on the desired mode of release. In the case of an erodible device, the solvent is selected to either dissolve the matrix or is selected to contain a second biomaterial which is deposited along with the drug. In the first case, the printed droplet locally dissolves the polymer powder and begins to evaporate. The drug is effectively deposited in the polymer powder after evaporation since the dissolved biomaterial is deposited along with the drug. The case where both the drug and a biomaterial are dissolved in the printed solution is useful in cases where the powder layer is not soluble in the solvent. In this case, binding is achieved by deposition of the drug biomaterial composite at the necks between the powder particles so that they are effectively bound together.

Aggressive solvents tend to nearly dissolve the particles and reprecipitate dense biomaterial upon drying. The time for drying is primarily determined by the vapor pressure of the solvent. The biomaterial solubility range, for example, over 30 weight percent solubility, allows the biomaterial to dissolve very quickly and during the time required to print one layer, as compared with a biomaterial having lower solubility. The degree to which the particles are attached depends on the particle size and the solubility of the biomaterial in the solvent.

There are essentially no limitations on the actives that can be incorporated into the devices, although those materials which can be processed into particles using spray drying, atomization, grinding, or other standard methodology, or those materials which can be formed into emulsions, microparticles, liposomes, or other small particles, and which remain stable chemically and retain biological activity in a polymeric matrix, are preferred.

Those actives which can be directly dissolved in a biocompatible solvent are highly preferred. The nature of the active may be but is not limited to: proteins and peptides, polysaccharides, nucleic acids, lipids, and non-protein organic and inorganic compounds, referred to herein as "bioactive agents" unless specifically stated otherwise. The actives include but are not limited to: neuropharmaceuticals, vasoactive agents, anti-inflammatories, antimicrobials, anti-cancer, antivirals, hormones, antioxidants, channel blockers, growth factors, cytokines, lymphokines, and vaccines. These materials have biological effects including, but not limited to growth factors, differentiation factors, steroid hormones, immunomodulation, and angiogenesis promotion or inhibition. It is also possible to incorporate materials not exerting a biological effect such as air, radiopaque materials such as barium, or other imaging agents.

Tissue Regeneration Devices

An improvement on existing techniques, using three-dimensional printing, is to selectively deposit the soluble phase to form internal soluble patterns prior to building any external features. Water soluble materials such as poly (ethylene glycol) can be deposited on a flat surface prior to spreading a new layer of powder. This enables the process to build walls of soluble material. Loose powder can be spread after completion of the patterning. The external or insoluble features of the specimen can then be built by printing with binder solution. Following the requisite iterations of the patterning and printing processes a device is produced that has intricate internal features that can be dissolved easily when immersed in an appropriate solvent. This concept can be used to fabricate components with controlled internal pores or channels. Devices that are relatively insoluble in physiological fluids can be designed and controllably fabricated with soluble pores or channels within.

Channels bounded by walls and consisting of substantially straight passageways of defined width, length, and orientation are a microarchitectural feature of the present invention. Staggered channels extending through the device and offset by 90° in different layers of the device are one particularly preferred embodiment. Staggering the channel and walls increases the strength of the device relative to a straight through channel design. The width of the channels can range from about 150 to 500 microns, with 200 microns preferred to maximize the surface area available for cell seeding without compromising structural integrity or homogeneity of tissue formation.

The solvent drying rate is an important variable in the production of polymer parts by 3DP. Very rapid drying of the solvent tends to cause warping of the printed component. Much, if not all, of the warping can be eliminated by choosing a solvent with a low vapor pressure. Thus, PCL parts prepared by printing chloroform have nearly undetectable amounts of warpage, while large parts made with methylene chloride exhibit significant warpage. It has been found that it is often convenient to combine solvents to achieve minimal warping and adequate bonding between the particles. Thus, an aggressive solvent can be mixed in small proportions with a solvent with lower vapor pressure.

Synthetic polymers which have been found to be particularly suited to the production of medical devices for tissue engineering and concurrent active release include: poly (alpha)esters, such as: poly(lactic acid) (PLA) and poly(DL-lactic-co-glycolic acid) (PLGA). Other suitable materials include: poly(ε-caprolactone) (PCL), polyanhydrides, polyarylates, and polyphosphazene. Natural polymers which are suitable include: polysaccharides; cellulose dextrans, chitin, chitosan, glycosaminoglycans; hyaluronic acid or esters, chondroitin sulfate, and heparin; and natural or synthetic proteins or proteinoids; elastin, collagen, agarose, calcium alginate, fibronectin, fibrin, laminin, gelatin, albumin, casein, silk protein, proteoglycans, Prolastin, Pronectin, or BetaSilk. Mixtures of any combination of polymers may also be used. Others which are suitable include: poly(hydroxy alkanoates), polydioxanone, polyamino acids, poly(gamma-glutamic acid), poly(vinyl acetates), poly(vinyl alcohols), poly(ethylene-imines), poly(orthoesters), polypohosphoesters, poly(tyrosine-carbonates), poly(ethylene glycols), poly(trimethlene carbonate), polyiminocarbonates, poly(oxyethylene-polyoxvpropylene), poly(alpha-hydroxy-carboxylic acid/polyoxyalkylene), polyacetals, poly(propylene fumarates), and carboxymethylcellulose.

The tissue engineering devices may be constructed to include actives which are incorporated during the fabrication process or in post-fabrication process. Actives may include bioactive agents as defined above or compounds having principally a structural role. Bioactive compounds having principally a structural role are, for example, hydroxvapatite crystals in a matrix for bone regeneration. The particles may have a size of greater than or less than the particle size or the polymer particles used to make the matrix. It is also possible to incorporate materials not exerting a biological effect such as air, radiopaque materials such as barium, or other imaging agents for the purpose of monitoring the device in vivo.

Use of Solid Free-Form Fabrication to Prototype and Manufacture

Figure 2:
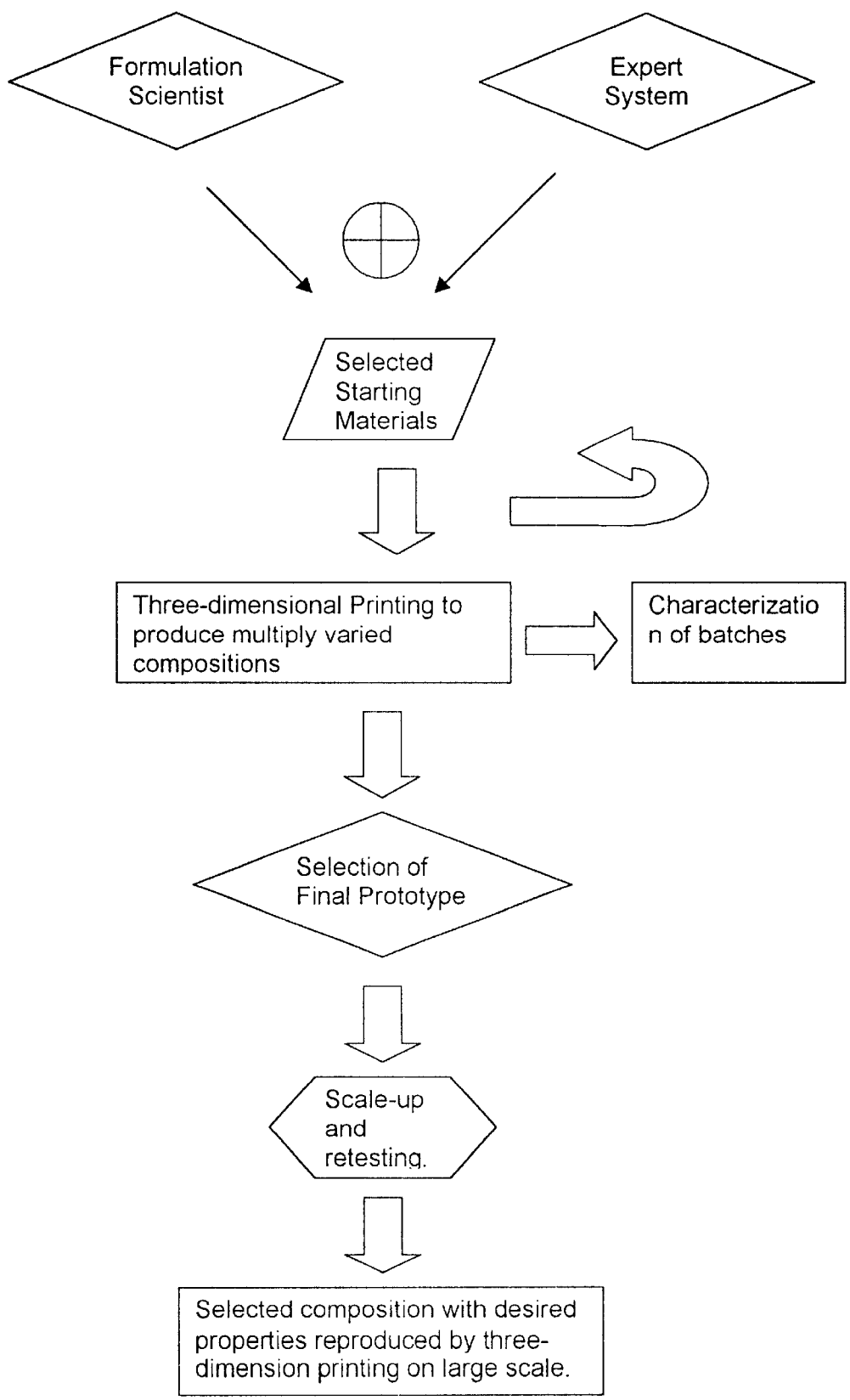
FIG. 2 shows a flow diagram of the rapid prototyping process of the invention for pharmaceutical formulation development in accordance with one embodiment of the present invention.

The methods of this invention provide an opportunity to greatly facilitate increased efficiency in formulation development, leading to celerity in transition to manufacturing and eventual introduction of products to market. It is possible to deliver prototypes for stability studies within a few working days after receipt of the drug substance. Then after stability samples are evaluated, it is conceivable to manufacture dosage forms with different strengths and drug release profiles under GMP conditions in a short period of time. Thus, formulation development is greatly facilitated and achieved with increased efficiency. The basic steps of the process are as follows and further shown schematically in FIG. 2:

1. The compound to be formulated is selected and several prototype designs are developed to achieve the desired drug release characteristics. The chemical structure and properties of the compound are not essential, but help expedite the overall process when available. Physicochemical parameters that may be of utility in the formulation decision process include solubility, stability, reactive groups, pKa, and volatility.

2. Using a statistically based multifactorial design, several replicates of various strengths and compositions are fabricated. These different formulations may be fabricated in the same powder bed either sequentially or simultaneously; the former method provides a large number of samples for each formulation while the latter gives less number of samples but in a significantly shorter time period. These prototype formulations are then tested for dissolution and physico-mechanical properties. The best candidate(s) are then scaled-up to a few thousand (or more) units for stability testing.

3. In addition to conducting the FDA-required, long-term stability studies under controlled temperature and humidity conditions, which often take a few years, high-sensitivity instruments such as the isothermal microcalorimeter may be employed to obtain early predictions of product stability in weeks.

4. Following stability evaluation of the prototypes, the best formulation is chosen for clinical trials and can be manufactured reproducibly using the same program for machine instructions.

5. The fabrication of a clinical batch of the final product can be completed in a few days.

The rapid prototyping capabilities of computer-guided manufacturing process will therefore reduce the time required for formulation development and manufacturing by several weeks or months as compared to traditional procedures, such as tablet compression. This is especially true for development of dosage forms of the same active(s) in different strengths, e.g., dosage forms containing 0.5, 1.0, 1.5, 2.0, and 2.5 milligrams of an active, needed for dose-ranging clinical studies. The savings in time and cost can be further magnified as more information is compiled by the operators and incorporated into the Expert System.

Use of an Expert System in Conjunction with the Rapid Prototyping Method

Expert Systems are computer programs, which aim to capture the information and experience of an "expert" in a particular technical area or profession. The Expert System, therefore, is comprised of data, which is generally known or known within a context, and can use rules or derive rules that make that data useful. Thus, the Expert System is a knowledge acquisition tool. The Expert System uses its knowledge to perform reasoning, and the reasoning process may be characterized as automated, case-based, rule-based, or model-based.

Figure 4:
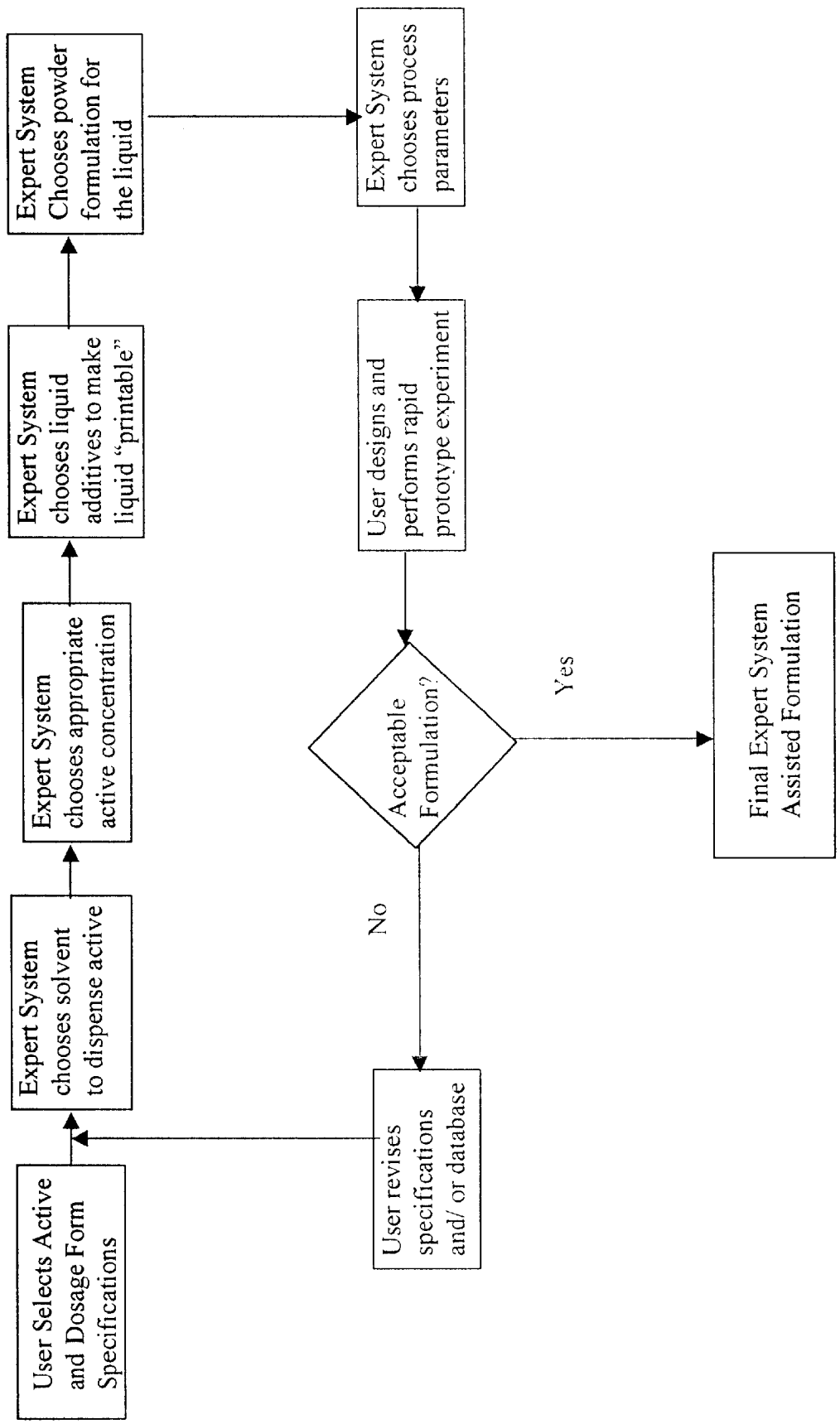
FIG. 4 is a flow diagram of an Expert System process in accordance with one embodiment of the present invention.

FIG. 4 is a flow diagram of one Expert System process. In one embodiment of the present invention, an Expert System interfaces with the prototyping to select the starting materials. The Expert System, which has been particularly useful in this regard, is one that uses rule-based reasoning with "fuzzy logic". In this way, the ranges of properties associated with the materials behavior in the context of the 3DP process need not be specified absolutely and the system can learn from experience and, furthermore, make use of qualitative measurements. That is, the rule-based reasoning has back and forward chaining capabilities.

In one embodiment, the Expert System can be comprised of the following six databases:

1. Users
2. Machine
3. Inactives, meaning excipients, flavors, colorants, and the like.
4. Actives
5. Solvents
6. Process parameters and performance parameters.

The system possesses a degree of interactivity in so far as the scientist may input some of the parameters. Data collection for the Expert System databases, furthermore, takes a structured approach and produces information compatible with the unique features of the SFF technique. For the 3DP process aimed at producing oral dosage forms and other medical devices which are biocompatible, the list of powders to be examined includes, but is not limited to, those materials which are pharmaceutically acceptable.

Whenever a new material is tested with the powder test protocol or used on a 3DP machine, a record sheet is completed with all relevant information available at the time. The record sheet is designed to allow a single record to be submitted for a powder tested with multiple binders. If subsequent experiments are performed on the material and new information is collected, or information already submitted is revised, then an additional record sheet which identifies the material along with the additional or changed data may be submitted. A system manager will incorporate the data on the sheets into the Expert System database.

The data collected may be of the following form.
1. Material identification and description.
   a. The name of the material can be a generic polymer name (or initials) such as polycaprolactone or PLGA. If the material has a trade name, that name should also be indicated. For polymer materials, the molecular weight should be indicated, as well as the component ratio for co-polymers. The manufacturer of the material(s) should also be indicated with the manufacturer's lot number. If the materials have been reprocessed subsequent to their receipt, this should be indicated by information on the records that describe the reprocessing.
   b. Data on the composition of the powder bed and binder is entered in the appropriate blanks. If the powder or binder is a mixture of materials, indicate the ratio of the mixture.
   c. For materials which are used as powders the following information is collected: density, tap density, high and low particle size, color, surface area (if available), storage precautions (hygroscopic, toxic, etc.) and solubility in common solvents (water, ethanol, acetone, chloroform). For materials to be used in the binder the following information is collected: density, color, solubility in common solvents, storage precautions, viscosity of solutions (both viscosity and concentration of the solution should be entered), flow rate through a nozzle, tank pressure, stability of flow, and filtration requirements.
2. Testing of materials.
   a. Spread test. The thickness of the thinnest layer spread, a qualitative assessment of the spread (good, average, poor, unusable), what surface was used to get the powder to spread (stainless steel plate, aluminum plate, double stick tape, etc.), any problem with electrostatic effects, and the humidity in the lab during the spread test.
   b. Drop test. The binder(s) used, drop volume, the wetting and infiltration time (<1 sec, 1–10 sec, >10 sec), the degree of bleeding, and the diameter of the area of powder bed affected by the drop. The primitive is retrieved and is strength, hardness and size are assessed and recorded.
   c. Line test. The depth of the powder bed for the test, the binder(s) used, the flow rate of binder, the printhead speed on the machine, an assessment of the bleeding, and the extent of ballistic ejection. The lines are allowed to dry and the line primitives retrieved from the powder bed. Line strength is reported qualitatively and diameter is measured using SEM (if available). The degree of warpage of the line primitives is indicated, as well as when the warpage occurred (during printing, or upon drying).
   d. Ribbon test. The depth of the powder bed for the test, the binder(s) used, the flow rate of binder, the printhead speed on the machine, the line spacing, an assessment of the bleeding, and the extent of line pairing. The ribbon is allowed to dry and the ribbon primitive retrieved from the powder bed. Ribbon thickness is recorded as well as a qualitative assessment of ribbon strength. The degree of warpage of the ribbon primitives is indicated, as well as when the warpage occurred (during printing, or upon drying).
   e. Wall test. The depth of the powder bed for the test, the binder(s) used, the flow rate of binder, the printhead speed on the machine, the line spacing in the base ribbon, and the layer thickness of each wall layer. The walls are allowed to dry and the wall primitives retrieved from the powder bed. Wall thickness is recorded. Wall strength is reported qualitatively, with an assessment of lamination. The degree of warpage of the wall primitives is indicated, as well as when the warpage occurred (during printing, or upon drying).
   f. Degradation/dissolution. When a device is constructed from new or known material(s) as identified, and tested for dissolution (for oral dosage forms) or degradation (oral dosage forms, implantable dosage forms, or tissue scaffolds), the following information should be collected and entered in a new record sheet: time until the device breaks into small pieces, time until the device completes degradation or dissolution. The complete details of the device construction should be entered as well: size, powder bed, binder, flow rate, print head speed, layer thickness, and line spacing.

Alternatively, the use of material test results and the learning therefrom are not restricted to the purpose of generating data for use in the Expert System but rather can be applied directly by the human expert, the scientist or group of scientists selecting the materials to be used in the first prototyping run. The initial prototyping run typically consists of an array of prototypes (1–9,000, depending upon the size of each prototype and number of samples required) on a single 6"×12" powder bed (development 3DP machine). In addition, the desired variation between prototype compositions is typically achieved by changing the liquid deposition parameters. Powder materials are more usually varied from one fabrication run to another. Thus, it may be seen that an unusually large number of different prototypes may be made in a single fabrication step.

Additionally, because the prototypes are fabricated in the same manner regardless of the number, the problem of "scale-up" is not encountered. Scale-up problems may occur when the same materials or mixtures of materials used in small scale manufacturing process are subjected to similar processes, but in larger volumes using bigger machines, which generate different forces, mixing properties, and heat conduction effects. However, in SSF techniques, particularly in 3DP manufacturing, scale-up does not alter the manner in which the materials interact in the process of creating a prototype using the processes of the present invention.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings provided herein of the invention can be applied to other fabrication processes, not necessarily the exemplary computer-aided fabrication process described above.

The various embodiments described above can be combined to provide further embodiments. All of the above U.S. patents and applications are incorporated by reference. Aspects of the invention can be modified, if necessary, to employ components and devices of the various patents and applications described above to provide yet further embodiments of the invention.

EXAMPLES

Example 1

Base Formulation Development for Rapidly Dissolving Dosage Forms

The objective of this experiment was to develop a base formulation for oral, rapid-dissolve dosage forms. Upon development of the base formulation, different actives may be incorporated and optimized to make different products. These dosage forms do not need to be swallowed for their therapeutic activity and, therefore, do not require water or other liquids during administration. These dosage forms are intended to disperse in the mouth within seconds upon placement on the tongue. Since the addition of the actives to the base formulation could increase the dispersion time, it was desired that the base formulation not have a dispersion time of more than 5 seconds.

Five different formulations were fabricated by using the same powder blend but depositing different amounts of the binding agent through the printing fluid. In this experiment, twenty dosage forms of each of the five formulations were fabricated simultaneously on the same powder bed. The composition was varied by keeping the fluid flow rate constant but using different printhead speeds of 1.00, 1.25, 1.50, 1.75, and 2.00 m/s as it traversed over the different sets of dosage forms. The fabrication parameters and the properties of the finished dosage forms are listed below and set forth in a U.S. patent application Ser. No. 09/027,183 filed Feb. 20, 1998 incorporated herein.

Powder composition: 95:5 mixture of lactose:Kollidon 25 (a grade of polyvinylpyrrolidone)
Fluid composition: 20% (wt./vol.) Kollidon 25 in 50:50 ethanol:water
Fluid flow rate: 1.2 ml/min
Layer thickness: 200 μm
Line spacing: 170 μm
Number of layers: 18
Stencil hole diameter: 1 cm
Print speeds: 1.00, 1.25, 1.50, 1.75, and 2.00 m/s

TABLE 1

Physical properties of the dosage forms (average of 5 dosage forms)

| Speed (m/s) | Diameter (cm) | Height (cm) | Weight (g) | Bulk Density (g/cm3) | Dispersion Time (s) | Hardness (kp) | Friability (%) |
|---|---|---|---|---|---|---|---|
| 1.00 | NA | NA | NA | NA | 9.2 | 3.1 | 14.5 |
| 1.25 | 1.11 | 0.410 | 0.262 | 0.658 | 5.63 | NA | NA |
| 1.50 | 1.06 | 0.409 | 0.230 | 0.635 | 5.06 | 2.8 | 17.2 |
| 1.75 | 1.04 | 0.399 | 0.208 | 0.613 | 4.30 | 2.3 | NA |
| 2.00 | 1.03 | 0.381 | 0.185 | 0.584 | 3.61 | 1.7 | 21.7 |

NA: Data not available

An increase in the print speed from 1.0 mis to 2.0 m/s reduces the total volume of fluid deposited through the printhead into the dosage forms by half. From Table 1, it can be seen that as the print speed increases, the bulk density (theoretical, calculated from the weight and dimensions of the dosage form) decreases. A simultaneous decrease in the dimensions and weight of the dosage forms is also seen. This is attributed to the fact that a decrease in the total volume of fluid droplets deposited onto the powder results in a decrease in the extent of binder containing solution spreading in the powder. Predictably, increasing the print speed also decreases the dispersion time and the hardness, and increases the friability of the dosage forms. The proportion of Kollidon 25 decreases in the dosage forms as the print speed increases because the number of fluid droplets contacting the powder bed per unit area decreases accordingly as shown by the data in Table 2.

TABLE 2

Composition of the dosage forms

| Print Speed (m/s) | Kollidon 25 (g) | Lactose (g) | Kollidon/Lactose ratio |
|---|---|---|---|
| 1.25 | 0.0384 | 0.2236 | 0.1716 |
| 1.50 | 0.0326 | 0.1974 | 0.1649 |
| 1.75 | 0.0284 | 0.1796 | 0.1584 |
| 2.00 | 0.0250 | 0.1600 | 0.1566 |

This example clearly demonstrates the capability of the 3DP process to fabricate prototypes of different compositions simultaneously within the same powder bed for rapid optimization. A critical parameter, print speed, could be varied in order to achieve formulations with the desired characteristic, a dispersion time of less than 5 sec.

Example 2

Pseudoephedrine HCl and Chlorpheniramine Maleate Rapid Dissolve Dosage Form Development The objective was to develop a formulation of a rapid dissolve dosage form containing 30 mg pseudoephedrine HCl and 2 mg chlorpheniramine maleate that would dissolve within 10 seconds (preferably 3 seconds) with a hardness greater that 3.0 kp and friability less than 10%.

Formulations with different compositions and/or dimensions were rapidly designed and fabricated using the 3DP process, and are described below and are set forth in U.S. patent application Ser. No. 09/027,183 filed Feb. 20, 1998 and incorporated herein.

Powder composition: 96:4 mixture of lactose:Kollidon 25 (polyvinylpyrrolidone)
Fluid 1 composition: 200 g/L Plasdone C-15 (polyvinylpyrrolidone) in water, used for double printing the top and bottom 2 layers
Fluid 2 composition: Solution containing the constituents listed in Table 3 in DI water, used for single printing the middle 14 layers
Fluid flow rate: 1.0 ml/min
Layer thickness: 200 μm
Line spacing: 170 μm
Number of layers: 18
Stencil hole diameter: 1.0 or 1.2 cm (see Table 4)
Print speeds: 1.75 m/s

TABLE 3

Ingredients added in D1 water to prepare different solutions for Fluid 2

| Formulation number | Pseudoephedrine hydrochloride (g/L) | Chlor-pheniramine maleate (g/L) | Plasdone C-15 (g/L) | Dosage form Diameter (cm) |
|---|---|---|---|---|
| 1 (Placebo) | 0 | 0 | 50 | 1.0 |
| 2 | 528 | 35 | 0 | 1.0 |
| 3 | 528 | 35 | 50 | 1.0 |
| 4 | 528 | 35 | 100 | 1.0 |
| 5 | 368 | 24.5 | 50 | 1.2 |

In all of these designs, more binding agent (polyvinylpyrrolidone) was incorporated in the top and bottom two layers by double printing these layers with Fluid 1. This strategy allowed the dosage forms to have stronger top and bottom layers, thereby increasing hardness and reducing friability, and a large middle portion with lower hardness, which enabled the dosage form to dissolve rapidly. The physical properties of the dosage forms are shown Table 4. Amongst the active-containing prototypes tested, formulation 5 comprising dosage forms of larger dimensions, and therefore, fabricated with less concentrated drug solutions to achieve the same drug content, exhibited significantly lower dispersion time and friability loss. This formulation was accepted as an optimized and a stability batch comprising 2,400 dosage forms was fabricated using the same computer program. Random sampling and testing of the dosage forms indicated that the experimental batch and the stability batch showed reproducible properties and drug content, demonstrating the ease of scale-up of the 3DP process.

TABLE 4

Properties of the different formulations

| Formulation Number | Dosage Form Diameter (cm) | Dispersion Time (s) | Hardness (kp) | Friability (% loss) |
|---|---|---|---|---|
| 1 (Placebo) | 1.0 | 3.0 | 2.4 | 10.8 |
| 2 | 1.0 | 9.0 | 3.1 | 11.9 |
| 3 | 1.0 | 9.1 | 4.2 | 10.0 |
| 4 | 1.0 | 10.5 | 4.8 | 10.4 |
| 5 | 1.2 | 3.5 | 3.8 | 8.0 |

Example 3

Simultaneous Fabrication of Different Implant Prototypes

Figure 3:
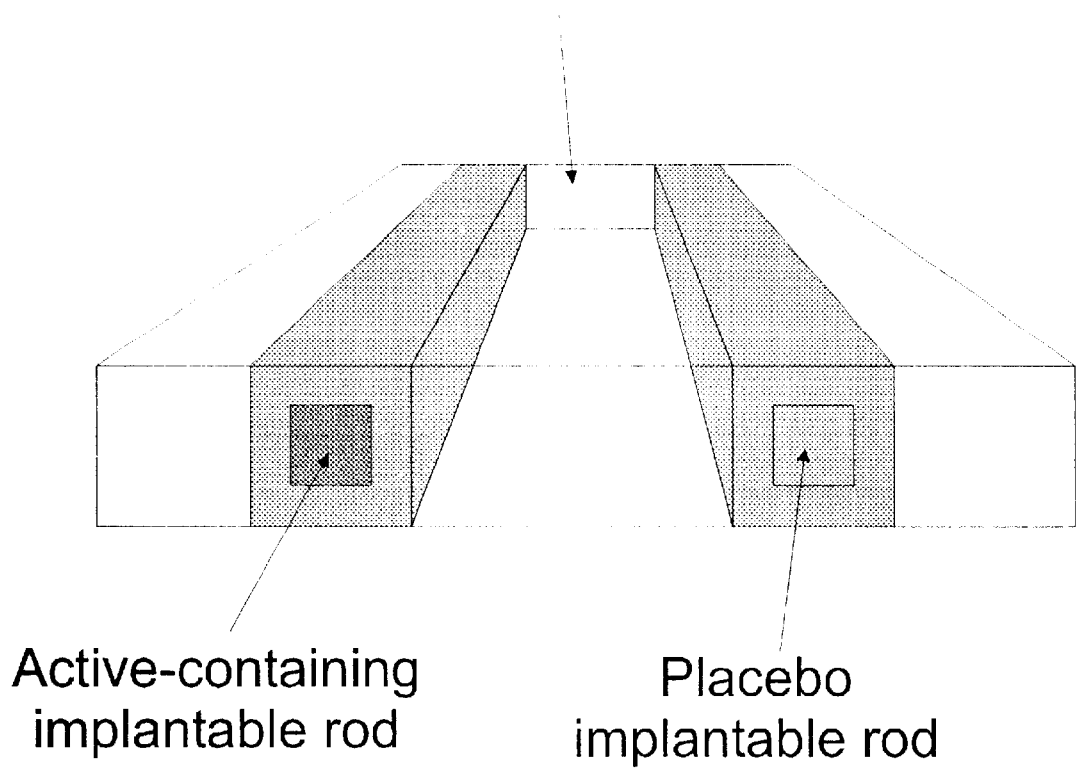
FIG. 3 is a schematic plan view of a powderbed wherein an active-containing device and a placebo device are being simultaneously fabricated in accordance with one embodiment of the present invention.

Several prototypes of biodegradable implants for sustained release of ethinyl estradiol for hormone replacement therapy have been fabricated. The 3DP process allowed rapid designing and fabrication of these implants of different polymer composition, drug placement, and dimensions. Each of the different prototypes have demonstrated different drug release and polymer resorption rates. In addition, for each of the prototypes, the placebo (used as controls) and drug-containing implants were fabricated simultaneously in the same powder bed. This simultaneous fabrication significantly reduced the development time and enabled rapid selection and optimization of the final product. FIG. 3 illustrates simultaneous fabrication of an active-containing device and a placebo device within a build cycle.

Example 4

Prototyping of Multi-Strength Dosage Forms Using Single Nozzle

The objective of this experiment was to develop prototype dosage forms containing different amounts of actives. Five distinct strengths of active content were simultaneously tested on a single build process. A model active compound, salicylic acid. dissolved in the printing solution, was deposited in epicenter of the dosage unit. Keeping a constant fluid flow rate while varying the speed and pattern of print head movement changed the active deposition amount in each of the prototype dosage forms. For example, the amount of active deposited per unit area doubled when the print head speed decreased in half. Table 5 summarizes the active content predicted from the fabrication parameters and that measured for each of the five prototype dosage forms that were simultaneously manufactured. The correlation between the predicted and the average measured content was 96.5% overall with an $R^2$ value of 0.997. The relative standard deviation in measurements of dosages forms from each prototype was less than 2%.

TABLE 5

Comparison of the designed and measured (n = 20) active content in multi-level active dosage example

| Predicted Active Content | Measured Active Content | Relative Standard Deviation |
|---|---|---|
| 0.000 µg | 0.000 µg | N/A |
| 0.532 µg | 0.521 µg | 1.54% |
| 1.000 µg | 0.962 µg | 1.61% |
| 1.523 µg | 1.489 µg | 1.32% |
| 2.030 µg | 1.945 µg | 1.42% |

Example 5

Prototyping of Multi-Strength Dosage Forms Using Multiple Nozzles

Several sets of prototype formulations for rapidly dispersing oral dosage forms containing pseudoephedrine hydrochloride (PEH) were simultaneously fabricated on the same powder bed using a multiple nozzle printhead. Compositions of the powder and printing solution were fixed while the flow rate of the printing solution through each of the nozzles varied. Eight different nozzles were used to dispense solution containing active at different flow rates, resulting in dosage forms with eight distinct levels of active content and physical properties. This type of prototyping approach is useful in rapidly determining the optimum level of powder to fluid and binder ratio to achieve best physical properties. Table 6 shows the flow rates, designed dose based on the flow rate, and measured dose from the sample prototype dosage forms. The average measured dose per dosage form (n=3) contained 101.2% of the predicted dose and the linear fit between the two sets of numbers had an $R^2$ value of 0.8725.

TABLE 6

Comparison of the flow rate, predicted active content, and measured active content in multi-strength dosage form example

| Flow Rate (g/min) | Predicted PEH Content (mg) | Measured PEH Content (mg) | Relative Standard Deviation |
|---|---|---|---|
| 1.063 | 29.52 | 30.23 | 1.0% |
| 1.135 | 31.50 | 32.25 | 1.0% |
| 1.143 | 31.72 | 31.59 | 1.4% |
| 1.167 | 32.38 | 33.12 | 0.6% |
| 1.206 | 33.48 | 32.98 | 1.4% |
| 1.210 | 33.59 | 34.11 | 1.6% |
| 1.214 | 33.70 | 34.06 | 2.6% |
| 1.286 | 35.69 | 36.39 | 2.6% |

Example 6

Use of the Expert System

The Expert System was used to design and conduct a rapid prototyping experiment for an active that had not previously been manufactured using the 3DP process of the present invention.

Diphenhydramine was added to the expert system's database, along with it's physical properties including density, solubility, and dose. The expert system program was run and a recommended formulation was suggested by the system based on previous formulations developed for other similar actives. The suggested formulation was:

| Powder Composition | | Printing Solution Composition | |
|---|---|---|---|
| Lactose | 82.90% | Water | 58.9550% |
| PVP | 1.10% | Diphenhydramine | 30.7350% |
| Orange Flavor | 6.00% | Polyvinylpyrrolidone | 10.2450% |
| Aspartame | 4.00% | Tween 20 | 0.0650% |
| Citric Acid | 6.00% | | |

The recommended processing conditions were as follows: 700 micron drop spacing, 250 micron layer thickness, 1.16 g/min flow rate, 800 Hz drop frequency, and 200 microsec pulse width.

A rapid prototyping experiment was designed using systematic variations of the powder composition and the flow rate. Other processing parameters and compositions were held constant.

Three powder compositions were chosen, as follows:

| Component | Powder A | Powder B | Powder C |
|---|---|---|---|
| Lactose | 82.90% | 80.90% | 84.00% |
| Polyvinylpyrrolidone | 1.10% | 3.10% | 0.00% |
| Orange Flavor | 6.00% | 6.00% | 6.00% |
| Aspartame | 4.00% | 4.00% | 4.00% |
| Citric Acid | 6.00% | 6.00% | 6.00% |

Note that Powder A is the expert system recommended formulation.

Four flow rates were chosen: 1.12 g/min, 1.16 g/min, 1.24 g/min, and 1.30 g/min. Each of the three powders was printed with the four flow rates. The resulting tablets were dedusted, collected from the build plates, and tested for "flashing" or dispersion time.

The results from this experiment can be fed back into the expert system database in order to improve future suggested formulations. FIG. 3 is a graphical representation of the measured parameter of flashing time versus the flow rate of the printing solution printed into powder beds with two different PVP K25 (polyvinylpyrollidone) concentrations and no PVP. The results demonstrate that the expert system chose a PVP concentration at which the flashing time was most consistent over a range of flow rates.

Example 7

Captopril Rapid Dissolve Dosage Form Development

Rapidly dissolving formulations for captopril has been developed and tested using the 3DP technology. A rapid prototyping experiment was designed using systematic variations of the powder composition and the flow rate. These experiments were designed to identify the optimum conditions for the powder compositions and printing parameters. Presented below is a subset of the experiments, which involved mannitol and maltitol as the major powder constituents. Flow rates were chosen to impart various levels of saturation in the powder when printed with the binder fluid. Other print parameters, such as the nozzle frequency, spacing between droplets, and layer thickness were kept constant throughout the experiments. These formulations were screened in a matter of hours by following a sequence of fabricating a plateful of dosage forms and then replacing the powder mixture to get ready for the next formulation.

TABLE 9

Differences in the formulations and the resulting characteristics

| Formulation number | Powder Composition | Flow Rate | Dispersion time (sec) | Compressive strength (MPa) |
|---|---|---|---|---|
| 1 | Mannitol:Maltitol (95:5) | 1.23 g/min | 6.1 | 0.77 |
| 2 | Mannitol:Maltitol (97.5:2.5) | 1.50 g/min | 6.6 | 0.68 |
| 3 | Mannitol:Maltitol (92.5:7.5) | 1.50 g/min | 14.5 | 0.63 |
| 4 | Mannitol:Maltitol (95:5) | 1.76 g/min | 17.4 | 0.50 |

Above dosage form dimensions were varied in order to keep the total dose level constant (at 25 mg/dosage form) regardless of the flow rate. This was accomplished by using different "print jobs". A print job is defined as a set of machine instructions that culminate into a series of printed parts. This practice of using different print jobs to fabricate various prototypes is analogous to opening different picture files and sending the print jobs to a same printer.

Example 8

Optimization of Drug Release by Prototyping of Oral Dosage Forms Containing an Anticancer Compound Cylindrical pellets were fabricated to deliver an anticancer compound, camptothecin with a unit dose of 0.5 mg. Due to the high toxicity of the compound, the pellets were designed to include two regions. The drug is embedded in a core region which is surrounded by a placebo shell region. The dosage form was thus designed in an attempt to reduce the handling safety hazard to workers and patients by avoiding direct exposure to the active. The pellets can be encapsulated in hard shell capsules to further protect the damage from attrition. By keeping the fabrication parameters and liquid formulations constant, the drug release can be controlled by changing the powder compositions. Samples were fabricated using different powder formulations (see Table 10) and the drug release of each formulation was evaluated using 0.1N hydrochloric acid with 1% sodium lauryl sulfate as dissolution medium. Fabrication of the five powder formulations can be completed in one day. The results shown in Figure X demonstrate the change of dissolution properties when the amount and type of excipients were varied. For example, adding more HPMC resulted in a significant decrease in the release rate, as observed in the differences between Formulations A and B, and C and D. When a portion (20%) of spray dried lactose was replaced by Avicel PH 301(microcrystalline cellulose) (Formulation E), the drug release was also effectively retarded, due to the slower erosion of the matrix which was networked by insoluble microcrystalline cellulose. In Formulation C, 20% of Avicel CL-611 was used to replace lactose in Formulation A, the drug release was also impeded by the presence of carboxymethylcellulose included in the Avicel CL-611, which functioned as a control release binder for other excipients in the powder bed. The formulation(s) for a specific drug release profile can be rapidly identified using this prototyping strategy. Moreover, the release rate obtained for a certain powder formulation can be further manipulated by varying the saturation level of the powder bed during fabrication or changing the binder formulations.

TABLE 10

Powder Formulations for Oral Dosage Forms Containing 0.5 mg Camptothecin

| Formulation code | A | B | C | D | E |
|---|---|---|---|---|---|
| Spray-dried lactose | 90% | 85% | 65% | 70% | 70% |
| HPMC (Pharmacoat 603) | 5% | 10% | 5% | 10% | 5% |
| Avicel CL-611 | 5% | 5% | 20% | 20% | 5% |
| PVP K-90 | | | 5% | 5% | |
| Avicel PH-301 | | | | | 20% |

What is claimed is:

1. A method of rapidly fabricating prototypes of multiple medical devices, each having individually selected parameters, using a computer-guided system, comprising:
   selecting the parameters of each of the devices to be fabricated;
   designing prototypes of the devices using a statistically-based multifactorial computer-guided system design to vary composition and structure of the medical devices according to the parameters; and
   manufacturing the medical devices in accordance with the selected parameters within a single manufacturing run.

2. The method of rapidly fabricating prototypes of medical devices, each having individually selected parameters, using computer-guided system of claim 1 wherein the computer-guided system interacts with an Expert System.

3. A method of rapid prototyping and manufacturing of multiple pharmaceutical dosage forms, each having individually selected parameters, comprising:
   selecting the parameters of the pharmaceutical dosage forms to be fabricated;
   designing prototypes of the selected pharmaceutical dosage forms using a computer-guided manufacturing process; and
   manufacturing the pharmaceutical dosage forms in accordance with the selected designs of the prototype within a single manufacturing run.

4. The method of rapid prototyping and manufacturing of multiple pharmaceutical dosage forms, each having individually selected parameters, of claim 3 wherein manufacturing the pharmaceutical dosage forms include simultaneous fabrication of dosage forms having different release profiles.

5. The method of rapid prototyping and manufacturing of multiple pharmaceutical dosage forms, each having individually selected parameters, of claim 3 wherein manufacturing the pharmaceutical dosage forms include simultaneous fabrication of dosage forms having different exterior sizes or geometry.

6. The method of rapid prototyping and manufacturing of multiple pharmaceutical dosage forms, each having individually selected parameters, of claim 3 wherein the computer-guided system includes an Expert System.

7. The method of rapid prototyping and manufacturing of multiple pharmaceutical dosage forms, each having individually selected parameters, of claim 6 wherein manufacturing the pharmaceutical dosage forms include simultaneous fabrication of dosage forms having varying API amounts.

8. The method of rapid prototyping and manufacturing of multiple pharmaceutical dosage forms, each having individually selected parameters, of claim 6 wherein manufacturing the pharmaceutical dosage forms include simultaneous fabrication of dosage forms having different internal architecture.

9. The method of rapid prototyping and manufacturing of multiple pharmaceutical dosage forms, each having individually selected parameters, of claim 3 wherein the manufacturing of the pharmaceutical dosage forms is carried out using solid free-form fabrication techniques.

10. The method of rapid prototyping and manufacturing of multiple pharmaceutical dosage forms, each having individually selected parameters, of claim 3 wherein the manufacturing of the pharmaceutical dosage forms is carried out using three dimensional printing.

11. The method of rapid prototyping and manufacturing of multiple pharmaceutical dosage forms, each having individually selected parameters, of claim 3, further including conducting long-term stability evaluations under controlled conditions.

12. The method of rapid prototyping and manufacturing of multiple pharmaceutical dosage forms, each having individually selected parameters, of claim 11 wherein the long-term stability evaluations include using at least one sensitivity instrument to obtain early predictions of compound stability.

13. The method of rapid prototyping and manufacturing of multiple pharmaceutical dosage forms, each having individually selected parameters, of claim 12 wherein the sensitivity instrument is an isothermal microcalorimeter.

14. The method of rapid prototyping and manufacturing of multiple pharmaceutical dosage forms, each having individually selected parameters, of claim 3, further including fabrication of a clinical batch of the compound.

15. The method of rapid prototyping and manufacturing of multiple pharmaceutical dosage forms, each having individually selected parameters, of claim 14 wherein the fabrication is complete in a few days.

16. The method of rapid prototyping and manufacturing of multiple pharmaceutical dosage forms, each having individually selected parameters, of claim 3 wherein the computer-guided manufacturing process is automated, case-based, rule-based, or model-based.

17. The method of rapid prototyping and manufacturing of multiple pharmaceutical dosage forms, each having individually selected parameters, of claim 3 wherein the computer-guided manufacturing process includes multiple databases.

18. The method of rapid prototyping and manufacturing of multiple pharmaceutical dosage forms, each having individually selected parameters, of claim 3 wherein the computer-guided manufacturing process databases are users, machines, inactives, actives, solvents, and process and performance parameters.

19. The method of rapid prototyping and manufacturing of multiple pharmaceutical dosage forms, each having individually selected parameters, of claim 3 wherein the computer-guided manufacturing process is interactive.

20. A method of rapid formulation development of multiple tissue scaffolds using a computer-guided manufacturing process, comprising:

selecting physio-chemical parameters and physio-mechanical properties of the tissue scaffolds, producing prototypes of the tissue scaffolds based on the physio-chemical parameters;

testing the physio-mechanical properties of the prototype; and reproducing multiple prototypes for stability testing in a single manufacturing run.

21. The method of rapid formulation development of multiple tissue scaffolds using a computer-guided manufacturing process of claim 20 wherein the selecting of the physio-chemical parameters and physio-mechanical properties include the use of an Expert System.

22. The method of rapid formulation development of multiple tissue scaffolds using a computer-guided manufacturing process of claim 20 wherein the physio-chemical parameters include solubility, stability, reactive groups, pKa and volatility.

* * * * *